A. H. JAHN.
CUT-OUT FOR GAS ENGINES.
APPLICATION FILED JUNE 6, 1916.
1,226,974.
Patented May 22, 1917.
FIG. 1
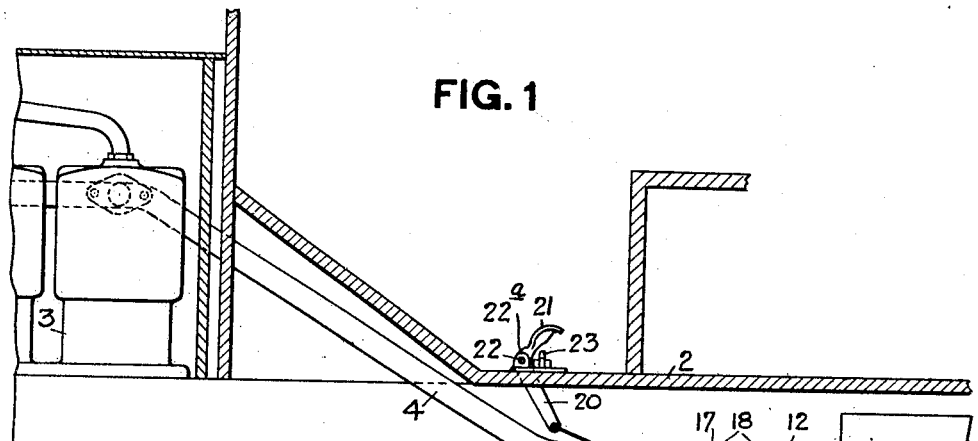
FIG. 3    FIG. 4
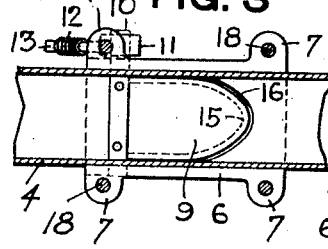 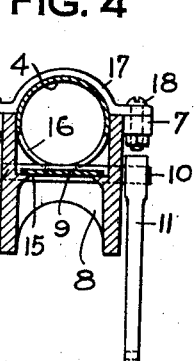
FIG. 2
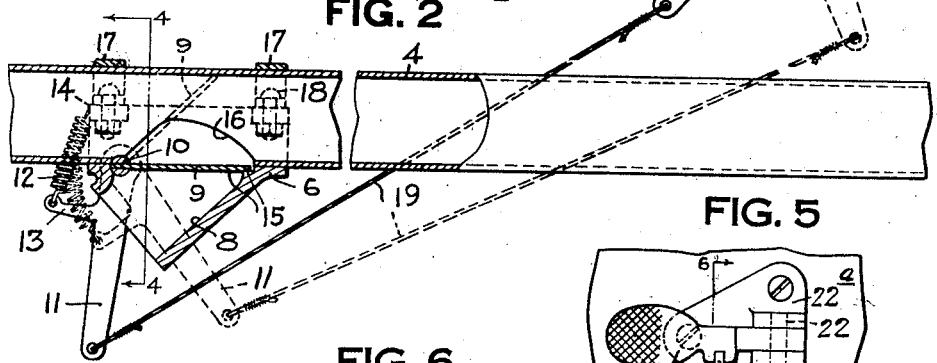
FIG. 5
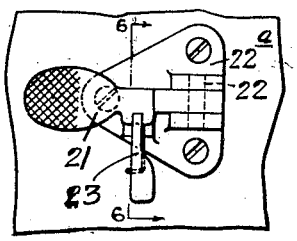
FIG. 6
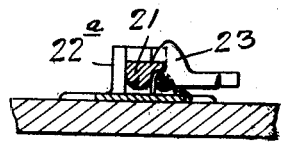
WITNESSES
INVENTOR

UNITED STATES PATENT OFFICE.

AUGUST H. JAHN, OF PITTSBURGH, PENNSYLVANIA.

CUT-OUT FOR GAS-ENGINES.

1,226,974.  Specification of Letters Patent.  Patented May 22, 1917.

Application filed June 6, 1916. Serial No. 101,897.

*To all whom it may concern:*

Be it known that I, AUGUST H. JAHN, a citizen of the United States, and resident of Pittsburgh, in the county of Allegheny and State of Pennsylvania, have invented a new and useful Improvement in Cut-Outs for Gas-Engines; and I do hereby declare the following to be a full, clear, and exact description thereof.

My invention relates to a cut-out for gas or internal-combustion engines.

The object of my invention is to provide an attachment of a simple character which may be readily applied to the exhaust-pipe of any internal-combustion engine without necessitating any change in the construction of the parts and whereby the exhaust instead of passing through the muffler may be quickly and efficiently directed to the atmosphere before reaching the muffler.

Referring to the drawing, Figure 1 is a view of my invention applied to a simple form of automobile, a portion of the automobile being shown in section; Fig. 2 is an enlarged view showing the exhaust-pipe and my improved attachment in section, and the connections with the operating treadle; Fig. 3 is a longitudinal section of a portion of the pipe with my attachment applied thereto; Fig. 4 is a cross-section on the line 4—4, Fig. 2; Fig. 5 is a plan view of the operating treadle; and Fig. 6 is a section on the line 6—6, Fig. 5.

I have illustrated my invention as applied to an automobile of the Ford type, although its adaptation to other types of automobiles, and even to stationary engines, will be apparent to anyone skilled in the art.

The numeral 2 designates the body portion of the automobile, 3 the engine, and 4 the exhaust-pipe leading to a suitable muffler 5. My improved attachment consists of a saddle-like valve body 6 having lugs 7 and the outlet 8. This outlet is normally closed by the valve-flap 9 hinged at 10 to the valve body. A lever-arm 11 is connected to the hinged member 10. A spring 12 is connected to the finger 13 on the lever-arm 11 and the opposite end of said spring is connected to the valve body at 14. This spring acts normally to hold the valve 9 on its seat 15.

To apply my improved attachment to the exhaust-pipe 4, said exhaust-pipe is cut away as at 16 and the saddle applied from below to inclose the opening 16. The yokes 17 engage the upper portion of the exhaust-pipe and bolts or other suitable fastening devices 18 connect said yokes with the valve body through the lugs 7. In this manner, the attachment is quickly and readily secured to the exhaust-pipe and held securely in position.

To provide for the operation of the valve 9 from a point within the automobile, the lever-arm 11 is connected by the cable 19 to the arm 20 connected to the treadle 21, said arm and treadle being mounted on the pin 22 journaled in the bracket 22ª. A spring-operated trip member 23 is adapted to engage the treadle 21 when forced down, as indicated in Fig. 5. This trip member is quickly thrown out of engagement to release the treadle, by the foot of the operator, as clearly indicated in Fig. 6.

With the car running along under ordinary circumstances, the exhaust of the engine will pass by the exhaust-pipe 4 through the muffler 5 in the ordinary manner, but when it is desired to cut out the muffler, the operator pressing his foot on the treadle 21, moves the arm 20 to the position indicated in dotted lines, Fig. 2, whereupon the lever-arm 11 is moved, and through its connection with the valve 9, said valve is thrown up into the position indicated in dotted lines, Fig. 2. The valve 9 is tongue-shaped at its forward end, as clearly indicated in Fig. 3, and when raised conforms to the arc of the exhaust-pipe so as to close the exhaust-pipe and entirely shut off communication to the muffler, the exhaust being directed out through the outlet 8 directly to the atmosphere. Where the cut-out is to be employed for any length of time, the operator locks the treadle by the latch 23 and the exhaust continues to pass out through the cut-out. When, however, it is desired to bring the muffler into play again, the operator with his foot quickly releases the latch 23, and the spring 12 acts to move the valve 9 to its closed position, as indicated in Fig. 2, whereupon the exhaust then passes directly to the muffler.

By my invention, I provide a simple form of cut-out, which consists of an attachment which is very simple in construction and which may be made at low cost. Also, one which is very readily applied to different styles of automobiles, it only being necessary to form an opening in the exhaust-pipe and connect the valve-operating arm up to a treadle within the car. It requires practically no reconstruction of any kind, and the parts are so simple that it is not liable to get out of order.

What I claim is:

In a cut-out for internal combustion engines, the combination of an exhaust-pipe and muffler, said exhaust-pipe having an elliptical-shaped opening formed therein intermediate the muffler and the engine, a valve-body adapted to be secured to said pipe, a valve-opening formed in said body in register with said first opening and having a valve-seat substantially flush with the exterior of said pipe, a flap-valve carried by said valve-body, said valve being so disposed as to form a bottom wall substantially flush with the interior of said pipe above said valve-opening when in engagement with said seat, and adapted when raised to seat against the edges of the said first-mentioned opening and the interior of the exhaust pipe to entirely close off communication to the muffler.

In testimony whereof, I the said AUGUST H. JAHN, have hereunto set my hand.

AUGUST H. JAHN.

Witnesses:
 JOHN F. WILL,
 IRENE F. GEYER.